(12) United States Patent
Tebbe et al.

(10) Patent No.: US 8,348,044 B2
(45) Date of Patent: *Jan. 8, 2013

(54) CONVEYOR APPARATUS

(75) Inventors: Nicholas R. Tebbe, Liberty Lake, WA (US); Glenn Davis, Spokane, WA (US)

(73) Assignee: FLSmidth A/S, Valby (DK)

( * ) Notice: Subject to any disclaimer, the term of this patent is extended or adjusted under 35 U.S.C. 154(b) by 0 days.

This patent is subject to a terminal disclaimer.

(21) Appl. No.: 13/413,080

(22) Filed: Mar. 6, 2012

(65) Prior Publication Data

US 2012/0175219 A1      Jul. 12, 2012

Related U.S. Application Data

(62) Division of application No. 12/615,624, filed on Dec. 3, 2009.

(51) Int. Cl.
*B65G 47/52*      (2006.01)
(52) U.S. Cl. ......... 198/301; 198/303; 198/312; 198/317
(58) Field of Classification Search .................. 198/301, 198/303, 311–320
See application file for complete search history.

(56) References Cited

U.S. PATENT DOCUMENTS

| | | | |
|---|---|---|---|
| 1,331,464 A | 2/1920 | Stuart | |
| 1,996,488 A | 4/1935 | Philips | |
| 2,851,150 A | 9/1958 | Boersma | |
| 3,297,141 A | 1/1967 | Janitsch et al. | |
| 3,314,525 A | 4/1967 | Krause et al. | |
| 3,604,757 A | 9/1971 | White | |
| 3,653,486 A | 4/1972 | McLean et al. | |
| 4,139,087 A | 2/1979 | Westhoff et al. | |
| 4,319,677 A | 3/1982 | Kipper | |
| 4,406,361 A | 9/1983 | Konigs et al. | |
| 4,629,060 A | 12/1986 | Schlegel et al. | |
| 5,090,549 A | 2/1992 | Thiel | |
| 5,230,587 A | 7/1993 | Pensoneau | |
| 5,562,194 A | 10/1996 | Wusten | |
| 5,609,397 A | 3/1997 | Marshall et al. | |

(Continued)

FOREIGN PATENT DOCUMENTS

FR            500729 A      3/1920

(Continued)

OTHER PUBLICATIONS

The international Search Report for PCT/IB2010/055539 dated Mar. 28, 2011 (5 pages).

*Primary Examiner* — Mark A Deuble
(74) *Attorney, Agent, or Firm* — Buchanan Ingersoll & Rooney PC

(57) ABSTRACT

A conveyor apparatus is provided that includes a frame and a cross conveyor. The cross conveyor has a moveable belt sized and configured to receive and move material. The cross conveyor is supported by the frame. The frame has a base and a plurality of rotatable members attached to the base. The rotatable members are configured to rotate to move the frame. The frame is sized and configured to be positionable adjacent to a mobile bridge conveyor having a tripper conveyor device such that a portion of the cross conveyor is positionable under an upper end portion of the tripper conveyor device to receive material from the tripper conveyor device and move the material to a storage area or stacking area for stacking the material. The tripper is preferably constrained to the frame of the mobile bridge conveyor.

21 Claims, 11 Drawing Sheets

U.S. PATENT DOCUMENTS

| | | |
|---|---|---|
| 6,085,890 A | 7/2000 | Kelly et al. |
| 6,098,780 A | 8/2000 | Kelly et al. |
| 6,360,876 B1 | 3/2002 | Nohl et al. |
| 6,782,933 B2 | 8/2004 | Marschke |
| 6,896,123 B1 | 5/2005 | Horak |
| 7,191,888 B2 | 3/2007 | Kahrger et al. |
| 2002/0187022 A1 | 12/2002 | Horak |
| 2003/0136632 A1 | 7/2003 | Bernard et al. |
| 2006/0201784 A1 | 9/2006 | Oury et al. |
| 2007/0039802 A1 | 2/2007 | Kahrger et al. |
| 2007/0102263 A1 | 5/2007 | Hoffmann |

FOREIGN PATENT DOCUMENTS

| | | |
|---|---|---|
| FR | 1314720 A | 1/1963 |
| GB | 111064 A | 11/1917 |
| JP | 60242115 A | 12/1985 |

CONVEYOR APPARATUS

CROSS-REFERENCE TO RELATED APPLICATION

The present application is a divisional application of U.S. patent application Ser. No. 12/615,624, which was filed on Dec. 3, 2009. The entirety of U.S. patent application Ser. No. 12/615,624 is incorporated by reference herein.

FIELD OF INVENTION

The present invention relates to material handling and, more particularly, relates to apparatuses and methods for stacking material such as ores, minerals or agglomerated material.

BACKGROUND OF THE INVENTION

Conveyors may be used in stackers to stack material or in devices configured to reclaim material from a stack. Typically, systems designed for stacking and reclaiming material utilize a number of conveyors. One set of conveyors is typically used to convey material to a stacker for stacking in a particular area. Another set of conveyors is used to reclaim the material stacked in that area. Examples of systems used to stack material or reclaim material are disclosed in U.S. Pat. Nos. U.S. Pat. Nos. 7,191,888, 6,782,993, 6,085,890, 5,609,397, 5,562,194, 5,090,549, 4,139,087, 3,604,757, 2,851,150 and 1,996,488, and U.S. Patent Application Publication No. 2007/0102263.

In addition to conveyors, other devices are typically used in stacking and reclamation systems. For instance, a stacker is typically used to stack material transported by a stacking conveyor system. Examples of stackers are disclosed in U.S. Pat. Nos. 3,297,141, 3,653,486, 4,319,677, 4,406,361, 4,629,060, 6,360,876, and 6,896,123.

Conveyor systems used to stack material or reclaim material often include a system of conveying devices. For example, overland conveyors are often used to transport material over relatively long distances to different locations. An overland stacking conveyor may be configured to move material from a material receiving location to a storage pile. An overland reclaiming conveyor may be configured to convey material from a storage area to an area designated for using the material. Typically, a mobile bridge conveyor or other conveyor is positioned adjacent to a stacking overland conveyor. An overland tripper or other device may be configured to feed material from an overland conveyor to the mobile bridge conveyor. The mobile bridge conveyor may stack the material or may move the material to a cross conveyor attached to the mobile bridge conveyor or a stacker for stacking the material.

Often, a mobile bridge conveyor includes and supports a tripper conveyor that is interconnected with a cross conveyor. The tripper conveyor transports material from the mobile bridge conveyor to the cross conveyor. The tripper conveyor typically shares a conveyor belt with the mobile bridge conveyor to lift and convey material. Typically, the tripper conveyor is moveably supported on the mobile bridge conveyor to ensure alignment and proper transport of material to the cross conveyor for stacking the material. Misalignment between the tripper and the mobile bridge conveyor can cause significant problems. For instance, due to a misalignment, material may be improperly conveyed or spilled and cause portions of the conveyor belt to be damaged. The cross conveyor is typically affixed to the tripper conveyor to receive material from the tripper conveyor and stack that material in a storage pile adjacent to the mobile bridge conveyor.

Systems that utilize a mobile bridge conveyor that has a tripper conveyor affixed to the cross conveyor are often very heavy due to the structural materials needed to support the material being transported. For instance, tripper conveyors of such devices can weigh 200,000 pounds or more. The tripper conveyor and cross conveyor are typically configured to move along the frame of the mobile bridge conveyor. The tripper conveyor may be attached to the cross conveyor and be supported by wheels that move along rails on the frame of the mobile bridge conveyor. The mobile bridge conveyor must support the tripper conveyor and the cross conveyor attached to the tripper conveyor at numerous different locations along the frame of the mobile bridge conveyor. Because of the size and weight of the tripper conveyor and the cross conveyor and the moveability of the tripper conveyor, numerous segments or portions of the mobile bridge conveyor frame must be configured to support the weight of the tripper conveyor and the cross conveyor. Such a requirement typically requires the frame of the mobile bridge conveyor to be over one million pounds.

Conveying devices of such weight are also very expensive. Generally, larger components take longer to design and build than smaller components. Therefore, such devices usually take a relatively long time to fabricate due to the size and weight of the devices and the components being incorporated in such devices.

Moreover, it is relatively expensive to modify such devices to improve the stacking capacity or stacking height such devices may provide. A large part of the expense associated with such modification is usually related to the large size and weight of the components that need to be modified.

Also, such mobile bridge conveyors are typically limited in their applicability for other projects. An owner of such a device may be able to use a mobile bridge conveyor for only one project that may last a set period of time or may only be able to use the device for a certain limited type of projects. However, due to the size and weight of the device and the capabilities of its tripper and cross conveyor devices, it may not be used to meet other needs for the owner.

Additionally, fabrication costs can limit mobile bridge conveyor design options. Typically, mobile bridge conveyors are only sized to be about three meters in width due to extensive shipping costs associated with wider sizes. If shipping is avoided, costly fabrication methods must be used to build a mobile bridge conveyor that is over three meters wide. As a result of this constraint, the maximum width between most tripper conveyor wheels, which are constrained to the mobile bridge conveyor, is about three meters. Such a width constraint may significantly alter the possible design options for a tripper conveyor due to safety and stability issues. Further, the length of the cross conveyer may also be limited due to stability and safety issues.

A conveying system is disclosed in U.S. Pat. No. 7,191,888, which discloses a mobile bridge conveyor and a separate tripper that is moveable relative to the mobile bridge conveyor. The moveable tripper includes a traveling tripper conveyor and a tipping bridge conveyor. The mobile bridge conveyor and the traveling tripper conveyor share a conveyor belt that travels from the bridge conveyor to the traveling tripper frame. The system disclosed in U.S. Pat. No. 7,191,888 requires the tripper to have a frame that is separate from the bridge conveyor that supports the tripper conveyor and the tipping bridge conveyor, which may also be referred to as a cross conveyor. The tripper may be moved relative to the bridge conveyor to adjust the position of the tripper conveyor and cross conveyor.

Moreover, the position of the mobile bridge conveyor and separate tripper may be adjusted relative to a feed conveyor. To make such an adjustment, the conveyor belt shared by the mobile bridge conveyor and the tripper conveyor of the tripper must be slackened. The slackening of the belt is necessary to avoid belt misalignment that may occur. As a practical matter, the slackening of the shared belt requires operations supported by the mobile bridge conveyor and tripper to be stopped or an auxiliary unit to be operational during this movement. Either alternative incurs significant costs associated with an auxiliary system or the temporarily ceased operations.

A new conveyor apparatus is needed. Preferably, the new conveyor apparatus is configured to reduce conveying down time for adjustments necessary for stacking material and also provides an improved conveying capacity.

SUMMARY OF THE INVENTION

A conveyor apparatus is provided that includes a frame and a cross conveyor supported by the frame. The cross conveyor has a moveable belt sized and configured to receive and move material. The frame has a base and a plurality of rotatable members attached to the base. The rotatable members are configured to rotate to move the frame. The frame is sized and configured to be positionable adjacent to a mobile bridge conveyor having a tripper conveyor device such that a portion of the cross conveyor is positionable under an upper end portion of the tripper conveyor device to receive material from the tripper conveyor device and move the material to a stacking area for stacking the material. The frame of the conveyor apparatus is moveable relative to the mobile bridge conveyor when adjacent to the mobile bridge conveyor.

In some embodiments of the conveyor apparatus, the rotatable members may be tracks, crawlers or wheels. Preferably, the frame is configured such that at least one rotatable member is attached to the base at opposite sides of the frame. The rotatable members may be pivotally coupled to the base of the frame or may be affixed to the frame.

In one embodiment of the conveyor apparatus, the base of the frame may include a rotatable portion that is configured to rotate the cross conveyor. The rotation of the portion of the base can permit the position of the cross conveyor to be adjusted without requiring the rotatable members to move.

In some embodiments of the conveyor apparatus, a luffing conveyor device can be attached to a first end of the cross conveyor. A luffing conveyor device may also be attached to a second end of the cross conveyor that is opposite the first end of the cross conveyor. It should be appreciated that each luffing conveyor device may be configured to provide retreat stacking.

In alternative embodiments of the conveyor apparatus, the cross conveyor may have a telescoping discharge structure attached to an end of the cross conveyor that is moveable from a retracted position to an extended position. Some embodiments of the conveyor apparatus that include a telescoping discharge structure may also include a moveable counterweight attached to the at least one of the frame and the cross conveyor may also be provided to move to balance the conveyor apparatus when the telescoping discharge structure is extended or retracted. Preferably, the counterweight is configured to move away from the telescoping discharge structure when the telescoping discharge structure is extended. It should be understood that the telescoping discharge structure may be configured to provide advance stacking.

Embodiments of the conveyor apparatus may also include one or more hoppers attached to the frame above the cross conveyor. The one or more hoppers are configured to be positioned adjacent to the upper end portion of the tripper conveyor device to receive material from the tripper conveyor device and guide that material to the cross conveyor when the frame is positioned adjacent to the mobile bridge conveyor such that a portion of the cross conveyor is positioned under the upper end portion of the tripper conveying device to receive material form the tripper conveying device and move the material. The material may be moved toward a stacking area for stacking the material.

The frame of the conveyor apparatus may be configured to releasably connect to the tripper conveyor device of the mobile bridge conveyor. Preferably, the conveyor apparatus is configured such that movement of the conveyor apparatus also moves the tripper conveyor device when the tripper conveyor device is connected to the frame. For instance, the tripper conveyor device may be configured to move along a path defined by rails supported by the mobile bridge conveyor's frame and may move along that path when connected to the frame of the conveyor apparatus and the conveyor apparatus moves adjacent to the mobile bridge conveyor. The conveyor apparatus may also include a power supplying device or a power distributing device configured to connect to the tripper conveyor device to transmit electricity to the cross conveyor to power a conveyor belt of the cross conveyor device or power some other component of the conveyor apparatus.

In one embodiment of the conveyor apparatus, the frame of the conveyor apparatus is configured such that the rotatable members are positioned on only one side of the mobile bridge conveyor when the frame is positioned adjacent to the mobile bridge conveyor such that a portion of the cross conveyor is positionable under the upper end portion of the tripper conveyor device to receive material from the tripper conveyor device and move the material to a stacking area for stacking the material. The frame may be configured such that the rotatable members are positioned adjacent to only one side of a mobile bridge conveyor so that the base of the conveyor apparatus is positioned between the mobile bridge conveyor and a stack of material. Alternatively, the frame may be configured such that the rotatable members are positioned adjacent to only one side of a mobile bridge conveyor so that the mobile bridge conveyor is positioned between the stack of material and the base of the conveyor apparatus.

In another embodiment of the conveyor apparatus, the frame of the conveyor apparatus is configured such that the base has a first portion attached to at least one of the rotatable members and a second portion attached to at least one of the rotatable members. The first and second portions of the base are spaced apart such that the frame is able to straddle the mobile bridge conveyor and move relative to the mobile bridge conveyor when the frame straddles the mobile bridge conveyor. The frame may also have a powering device or a power supplying device attached to the base that is configured to connect to a power distribution connector of the mobile bridge conveyor or a power distribution connector of a remote generator. The powering device or the power supplying device can be configured to connect to at least one of the rotatable members and the cross conveyor to provide power to at least one of the rotatable members and the cross conveyor. The powering device may be at least one of a generator, an engine, a hydraulic power unit, or a motor in some embodiments of the conveyor apparatus. The power supplying device may be wiring or a transformer.

In yet another embodiment of the conveyor apparatus, the frame can include at least one of the rotatable members positioned adjacent to a first side of the mobile bridge conveyor and at least one of the rotatable members positioned adjacent to a second side of the mobile bridge conveyor, which is opposite the first side of the mobile bridge conveyor, when the frame is positioned adjacent to the mobile bridge conveyor such that a portion of the cross conveyor is positionable under the upper end portion of the tripper conveyor device to receive material from the tripper conveyor device and move the material to a stacking area for stacking the material. The stacking area may be a storage pile, an area for stacking material, or an area for stacking material in a cavity or hole in the ground.

The cross conveyor of the conveyor apparatus may have a first end, a second end opposite the first end, and a middle portion between the first and second ends. The cross conveyor may be supported on the frame such that the first end of the cross conveyor is configured to be the portion of the cross conveyor that is positionable under the upper end portion of the tripper conveyor device to receive material from the tripper conveyor device. Alternatively, the cross conveyor may be supported on the frame such that the middle portion of the cross conveyor is configured to be the portion of the cross conveyor that is positionable under the upper end portion of the tripper conveyor device to receive material from the tripper conveyor device. It should be understood that the middle portion does not have to be in the center of the cross conveyor. While the middle portion may be a central portion of the cross conveyor, the middle portion can also be any portion of the cross conveyor that is located between the first and second ends of the cross conveyor.

The moveable belt of the cross conveyor may move in only one direction or may move in opposite directions. The moveable belt may be configured to move material toward a storage area or stacking area located adjacent to the first end of the cross conveyor when moving in a first direction and may also move material toward a storage area or stacking area located adjacent to the second end of the cross conveyor when moving in a second direction that is opposite the first direction. The storage area or stacking area may be an area for stacking material via retreat stacking or advance stacking.

A method of providing a conveying system for stacking material is also provided. The method includes providing a conveyor apparatus and providing a mobile bridge conveyor having a tripper conveyor device. The tripper conveyor device has an upper end and a lower end opposite the upper end. The conveyor apparatus can include a frame and a cross conveyor. The cross conveyor includes a moveable belt sized and configured to receive and move material. The cross conveyor is supported by the frame. The frame includes a base and a plurality of rotatable members attached to the base. The frame is sized and configured to be positionable adjacent to the mobile bridge conveyor such that a portion of the cross conveyor is positionable under the upper end of the tripper conveyor device to receive material from the tripper conveyor device. The mobile bridge conveyor and conveyor apparatus are configured to move material to a stacking area to stack the material when positioned adjacent to each other such that the portion of the cross conveyor is positioned under the upper end of the tripper conveyor device to receive material from the tripper.

It should be understood that different embodiments of the conveyor apparatus may be provided. For instance, any of the above discussed embodiments of the conveyor apparatus may be provided in embodiments of the method.

It should be appreciated that a general contractor or other entity may provide an embodiment of the conveyor apparatus, an embodiment of the mobile bridge conveyor or a conveying system for stacking to a client. A general contractor may be considered to provide certain features even if a subcontractor installs or makes those features for a client of the general contractor. For instance, a general contractor can provide a client cross conveyor, a conveyor apparatus, or a mobile bridge conveyor even if a subcontractor offers to make or makes one or more of these devices or installs the devices pursuant to an agreement with the general contractor. A general contractor may also be considered to provide a feature or device, such as mobile bridge conveyor or conveyor apparatus, by offering to make or install such devices for a client, or by offering to oversee or manage the installation of such devices.

Embodiments of the method of providing a conveying system may also include installing the mobile bridge conveyor, installing the conveyor apparatus, and maintaining the mobile bridge conveyor and the conveyor apparatus. Upgrading the mobile bridge conveyor or conveyor apparatus can also be included in embodiments of the method. Overland conveyors, mobile hoppers, mobile trippers, stackers, reclaimers, overland trippers or hoppers may also be provided in embodiments of the method. Of course, designing a site layout or designating certain areas for storage piles may also be included in embodiments of the method.

Embodiments of the method may also include providing a controller and at least one sensor. The controller is connected to the at least one sensor. The controller and the one or more sensors can be connectable to the conveyor apparatus, the mobile bridge conveyor, or both the mobile bridge conveyor and the conveyor apparatus. The controller is configured to cause the mobile bridge conveyor to move when at least one sensor senses that the conveyor apparatus moved a pre-selected distance away from the mobile bridge conveyor to move the mobile bridge conveyor closer to the conveyor apparatus. The controller may include one or more processors or processing units that are configured to run software stored on memory accessible to the one or more processors or processing units.

Other embodiments of our method may include providing a controller and at least one sensor, connecting the controller to the at least one sensor, and connecting the at least one sensor to at least one of the mobile bridge conveyor and the conveyor apparatus. The one or more sensors may be attached to the mobile bridge conveyor and the conveyor apparatus such that some sensors are on the mobile bridge conveyor and other sensors are on the conveyor apparatus. The controller is configured to cause the mobile bridge conveyor to move when the controller determines that the conveyor apparatus is within a pre-selected distance from the mobile bridge conveyor or outside of a pre-selected distance from the mobile bridge conveyor to move the mobile bridge conveyor closer to the conveyor apparatus.

Some embodiments of the method may include providing a controller and at least one sensor, connecting the controller to the at least one sensor, and connecting the at least one sensor to at least one of the mobile bridge conveyor and the conveyor apparatus. The controller can be configured to cause the conveyor apparatus to move when the controller determines that the conveyor apparatus is within a pre-selected distance from the mobile bridge conveyor or outside of a pre-selected distance from the mobile bridge conveyor to move the mobile bridge conveyor closer to the conveyor apparatus.

Yet other embodiments of the method can include providing a controller and at least one sensor, connecting the controller to the at least one sensor, and connecting the at least one sensor to at least one of the mobile bridge conveyor and the conveyor apparatus. The controller may be configured to cause the cross conveyor to move such that material is stacked in a straight pile during movement of the mobile bridge conveyor and the conveyor apparatus. For example, the controller can cause the cross conveyor to move by causing an end of the cross conveyor to retract or extend. As another example, the controller can cause the cross conveyor to move by causing the conveyor apparatus to move or by causing a portion of the conveyor apparatus to move.

A conveying system is also disclosed. The conveying system includes a mobile bridge conveyor having a conveyor belt and a tripper conveyor device aligned with the conveyor belt. Preferably, the tripper conveyor device is moveable supported by the mobile bridge and is constrained to the mobile bridge. The tripper conveyor device has a lower end aligned with the conveyor belt and an upper end opposite the lower end. The system also includes a conveyor apparatus. The conveyor apparatus includes a frame and a cross conveyor. The cross conveyor has a moveable belt sized and configured to receive and move material. The cross conveyor is supported by the frame. The frame is sized and configured to be positioned adjacent to the mobile bridge conveyor such that a portion of the cross conveyor is positionable under the upper end of the tripper conveyor device to receive material from the tripper conveyor device and move the material.

It should be understood that embodiments of the conveying system may include any embodiment of the conveyor apparatus discussed above or otherwise discussed herein. The system may also include a controller and at least one sensor. The controller is connected to the at least one sensor. The controller may be connected by wiring or by wireless communication devices. The controller is also connected to the conveyor apparatus, the mobile bridge conveyor, or both the conveyor apparatus and the mobile bridge conveyor. Each sensor can be connected to the conveyor apparatus or the mobile bridge conveyor such that at least one sensor is on each device. The controller is configured to cause the mobile bridge conveyor or the conveyor apparatus to move when the controller determines that the conveyor apparatus is a preselected distance away from the mobile bridge conveyor. Such a determination may be made by a comparison of location information obtained from the one or more sensors or by a calculation or determination made based on location information or distance information provided by the one or more sensors. The one or more sensors may be global positioning system ("GPS") sensors or other location or distance measuring sensors.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of apparatuses and systems for stacking and reclaiming material are shown in the accompanying drawings in which:

DETAILED DESCRIPTION OF PRESENT PREFERRED EMBODIMENTS

Figure 1:
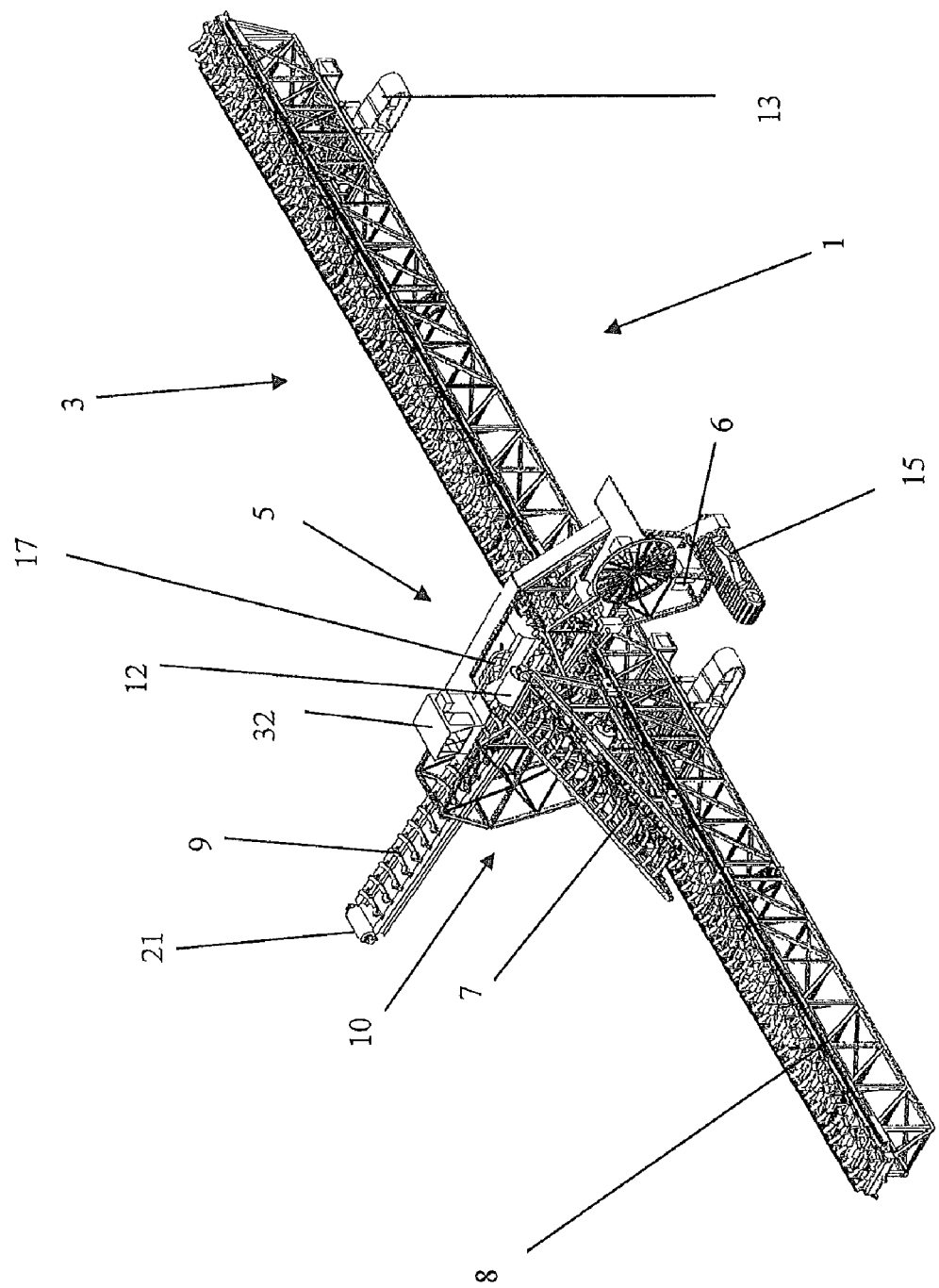
FIG. 1 is perspective view of a first present preferred embodiment of the conveying system, which includes a first present preferred embodiment of a mobile bridge conveyor and a first present preferred embodiment of a conveyor apparatus.
Figure 2:
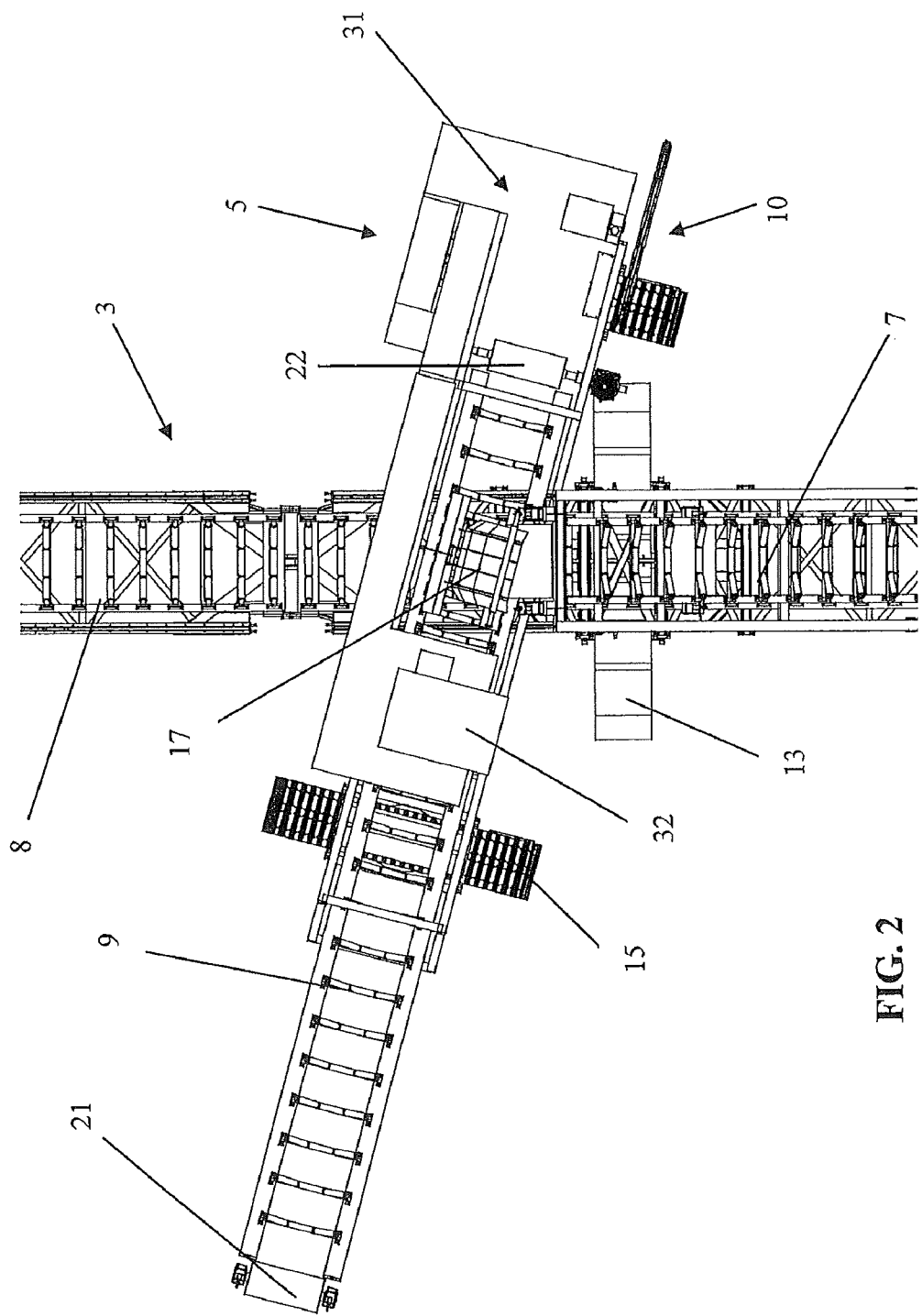
FIG. 2 is an enlarged fragmentary top view of the first present preferred embodiment of the conveying system with the conveyor apparatus shown in a correction angle position.

A present preferred embodiment of a conveying system 1 configured to stack material in a pile is shown in FIGS. 1-2. The system 1 includes a mobile bridge conveyor 3 and a conveyor apparatus 5. The mobile bridge conveyor 3 includes a frame 8 that supports rails and a conveyor belt. The frame 8 of the mobile bridge conveyor also supports a tripper conveyor device 7 that is moveable along the rails. The frame 8 includes a base that is attached to multiple rotatable members 13. Preferably, the rotatable members 13 are tracks or crawlers. It is contemplated that the rotatable members could be wheels in alternative embodiments.

The conveyor apparatus 5 includes a frame 10 that has a base that is attached to rotatable members 15. The rotatable members 15 are preferably tracks or crawlers. One portion 6 of the base is attached to one rotatable member 15 and a second portion of the base is attached to another rotatable member. The first and second portions of the base are spaced apart sufficiently for the frame 10 to straddle the mobile bridge conveyor 3 and also move relative to the mobile bridge conveyor while straddling the mobile bridge conveyor 3.

The frame 10 of the conveyor apparatus 5 supports a cross conveyor 9. The cross conveyor 9 has a moveable belt configured to move material. The material may be ore, minerals or agglomerated material. For instance, the belt can be configured to move coal, iron ore, or other material. A middle portion of the cross conveyor 9 is positioned below or under an upper end 12 of the tripper conveyor device 7. The cross conveyor 9 also has a first end 21 and a second end 22 opposite the first end. The middle portion is located between the first and second ends 21 and 22.

The frame 10 may also support a hopper 17 above a portion of the cross conveyor 9. The hopper 17 may be positioned below or side by side an upper end of the tripper conveyor device to receive material from the tripper conveyor device and position that material onto the cross conveyor 9 for stacking the material.

The cross conveyor 9 may be level and perfectly horizontal or may be inclined or declined relative to the ground or a horizontal axis. One or more pistons or other adjustment mechanisms may be attached to the frame 10 and the cross conveyor 9 to adjust the vertical position of the cross conveyor 9 or to level the cross conveyor 9. For instance, the one or more pistons may be attached between the cross conveyor 9 and the frame 10 such that the pistons can move the cross conveyor from a flat or horizontal position to an inclined position or a declined position.

The frame 10 of the conveyor apparatus 5 also supports other devices such as a deflector, drive cab, platforms, a transformer, and other relatively heavy equipment. The devices supported by the frame 10 may also include a powering device configured to distribute power to drive the rotatable members 15, the conveyor belt of the cross conveyor, or a conveyor belt of the tripper conveyor device 7. The powering device may include, for example, an engine, a hydraulic power unit or a motor. Wiring or other connection mechanisms may be provided to ensure power is distributed from the powering device to such components or to the tripper conveyor device 7. The powering device or other devices may be positioned within a housing or on a platform 31 of the frame 10. The frame may also support a cab 32 that includes actuators configured to permit a user to control the conveyor apparatus 5. The cab 32 may include a seat for the user, actuators configured to permit the user to steer or control movement of the rotatable members 15 or actuate movement of the rotatable members 15 and the cross conveyor 9.

The wiring of the conveyor apparatus 5 may also be sized and configured to connect to a cable running from a power supply or electricity grid to the mobile bridge conveyor 3. The tripper conveyor device 7 may include a portion of this cable and may include a cable reel that extends and gathers portions of the cable as the tripper conveyor device is moved relative to the mobile bridge conveyor. Another wiring or cable connection may couple a motor or power device supported on the frame 10 of the conveyor apparatus to power devices of the tripper conveyor device.

The frame 10 is configured to be releasably connected to the tripper conveyor device 7. The tripper conveyor device 7 may be configured to move along rails supported on the frame of the mobile bridge conveyor 3. The tripper conveyor device 7 may move along a path defined by the rails when the conveyor apparatus moves and the tripper conveyor device 7 is connected to the conveyor apparatus 5. It should be understood that such movement can permit the position of the cross conveyor 9 to be moved to adjust the stacking of material and also quickly permit adjustment of the tripper conveyor device 7 to help expedite adjustment to the stacking of the material in a stacking area, such as a storage area or a storage pile. The movement of the conveyor apparatus 5 can also permit the cross conveyor 9 to be moved to provide greater stacking coverage such that a more efficient use of storage area or a stacking area may be made.

Because the conveyor apparatus 5 and mobile bridge conveyor 3 are separate devices that are supported by separate frames, the weight of the mobile bridge conveyor 3 may be lower than the weight of a typical mobile bridge conveyor that would include a tripper conveyor and cross conveyor devices moveably constrained to the mobile bridge conveyor. Further, because the frame of the conveyor apparatus 5 can be configured to support heavy equipment that may be used to power or actuate the tripper conveyor device 7 and may also be configured to move the tripper conveyor device 7, much additional weight typically supported by the frame of the mobile bridge conveyor may be removed from the mobile bridge conveyor. The separation of the cross conveyor from the mobile bridge conveyor and tripper conveyor device can therefore permit mobile bridge conveyors to be built using much smaller components and can be functionally designed at much lower weights than would usually be required. Such weight reduction permits the cost of fabricating the mobile bridge conveyor to also be reduced dramatically because smaller components have a significantly lower cost. Further, the smaller design requirements permit many more vendors to bid on the fabrication of components of the mobile bridge conveyor, which may also reduce the cost of making such machines as a result of increased competition for such work. In addition, the mobile bridge conveyor may also be economically configured to move more material at a much faster rate.

Further, the separate conveyor apparatus that includes a cross conveyor can permit the adjustment of the tripper and cross conveyor to occur at least as quickly as in other more typical arrangements, if not more quickly. For instance, the tripper conveyor device can be pulled by movement of the conveyor apparatus after the conveyor apparatus is connected to the tripper conveying device to move both the cross conveyor and the tripper conveyor device to a new stacking location.

Also, the tripper conveyor device may be moveably constrained to the mobile bridge conveyor such that the tripper conveyor device is aligned properly with the mobile bridge conveyor even when the tripper conveyor device is moved relative to the mobile bridge conveyor. Such alignment prevents many, if not all, of the alignment issues that can arise through use of a separated tripper device, such as the separate tripper device disclosed in U.S. Pat. No. 7,191,888. Since the alignment is not an issue, the tripper device and mobile bridge conveyor may be moved about a storage area or leach pad while the conveyor belt of the mobile bridge conveyor and tripper conveyor device is moving. This permits tripper and cross conveyor adjustment without having to shut the conveyor belt down or otherwise stop the stacking of material during a repositioning of the bridge conveyor in tandem with the cross conveyor or tripper conveyor device. Such functionality can also eliminate the need for a costly auxiliary system or backup system.

Moreover, the conveyor apparatus can permit systems that may need to use multiple mobile bridge conveyors to service multiple stacking areas to only require one conveyor apparatus 5. As a result, systems may be built much quicker and at a lower cost than traditional systems. For example, the conveyor apparatus may be moved from one mobile bridge conveyor to another mobile bridge conveyor for stacking material. Therefore, there can be a dramatic cost savings in the cost of the mobile bridge conveyors because each mobile bridge conveyor does not have to include a cross conveyor and the heavy equipment necessary to power and control a tripper device and a cross conveyor. Thus, conveying systems may be provided at a much lower cost while also providing great design flexibility to meet customer needs.

Of course, it should be appreciated that more than one conveyor apparatus may be provided in embodiments of the conveying system. Moreover, additional other conveyors or other devices typically used in stacking systems such as stackers, overland conveyors, overland trippers and hoppers may also be provided in such systems.

It should be understood that the end 21 of the cross conveyor 9 may be attached to a luffing conveyor device. The luffing conveyor device can be configured to improve the stacking capacity or stacking ability provided by the cross conveyor. The luffing conveyor device may also include a telescoping portion. Alternatively, a telescoping discharge structure may be attached to the end 21 of the cross conveyor.

Figure 8:
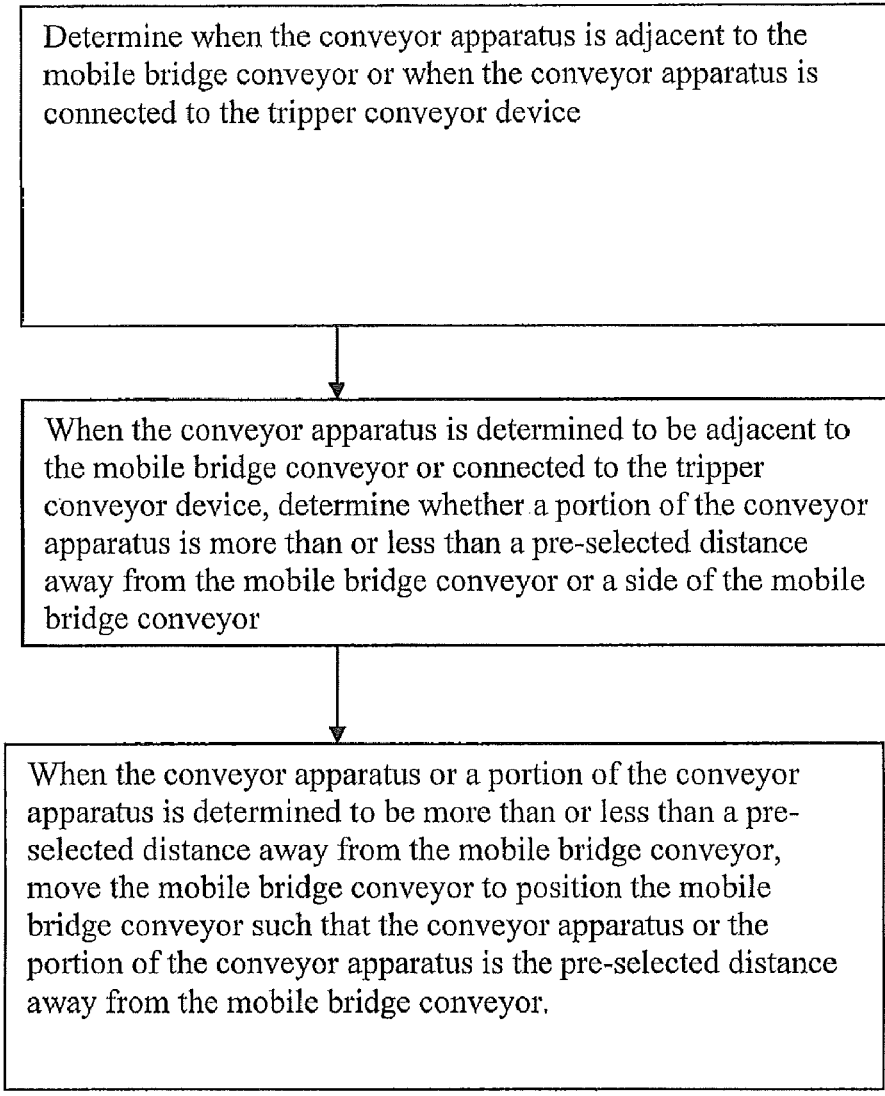
FIG. 8 is a flow chart illustrating a present preferred method of determining when to adjust the position of the mobile bridge conveyor when the conveyor apparatus is straddling the mobile bridge conveyor of the first present preferred conveying system or if the conveyor apparatus is connected to the tripper conveyor device for receiving material from the tripper conveyor device to stack that received material.

A controller and one or more sensors may be attached to the mobile bridge conveyor 3. For instance, a sensor may be attached to each end of the mobile bridge conveyor and may also be attached to an upper end portion of the tripper conveyor device 7. One or more sensors may also be attached to the conveyor apparatus 5. For example, a sensor may be attached at each end of the cross conveyor 9 of the conveyor apparatus 5. The controller 3 includes one or more processing units and memory that has software configured to be processed by the one or more processing units. The software may include a program configured to adjustably move the mobile bridge conveyor in response to movement of the conveyor apparatus 5 when the one or more sensors detect that the conveyor apparatus is straddling the mobile bridge conveyor and has moved a pre-selected distance away from a portion of the mobile bridge conveyor. The flow chart of FIG. 8 illustrates an embodiment of a method that the software that is run by a processing unit of a controller may be designed to implement to determine when to adjust the position of the mobile bridge conveyor.

For example, if a sensor detects that the conveyor apparatus 5 is straddling the mobile bridge conveyor 3 and has moved such that the frame is positioned very close to a first side of the mobile bridge conveyor and is relatively far away from the opposite second side of the mobile bridge conveyor, the controller may actuate the rotatable members 13 of the mobile bridge conveyor to move the mobile bridge conveyor 3 in the direction of the second side of the mobile bridge conveyor to position the second side of the mobile bridge conveyor closer to the conveyor apparatus 5 and the first side of the mobile bridge conveyor farther from the frame of the conveyor apparatus. Such movement can help keep the mobile bridge conveyor 3 in a desirable alignment with the conveyor apparatus 5.

Additionally, or as an alternative, the controller and sensors may be configured to cause the conveyor apparatus 5 to move to adjust the position of the conveyor apparatus when it is sensed or determined that a portion of the conveyor apparatus 5 is too close or too far away from the mobile bridge conveyor. Preferably, the sensors are GPS sensors. However, the sensors may include other types of location sensors or may be distance measuring sensors or other sensors.

When the controller determines that the position of the conveyor apparatus 5 needs to be adjusted closer to the mobile bridge conveyor 3, the controller may cause the tracks 15 to pivot so that the conveyor apparatus 5 moves closer to the mobile bridge conveyor as it moves adjacent to the mobile bridge conveyor. Once the controller determines that the conveyor apparatus is a predetermined distance or distance range of the mobile bridge conveyor, the controller may then cause the tracks to move so that the conveyor apparatus moves parallel to the mobile bridge conveyor. Of course, the controller may alternatively cause the mobile bridge conveyor to move closer to the conveyor apparatus upon determining that the mobile bridge conveyor is a predetermined distance from the conveyor apparatus. Such movement may be linear or angular. For instance, the mobile bridge conveyor may move perpendicular to the movement of the conveyor apparatus or may move angularly.

Figure 3:
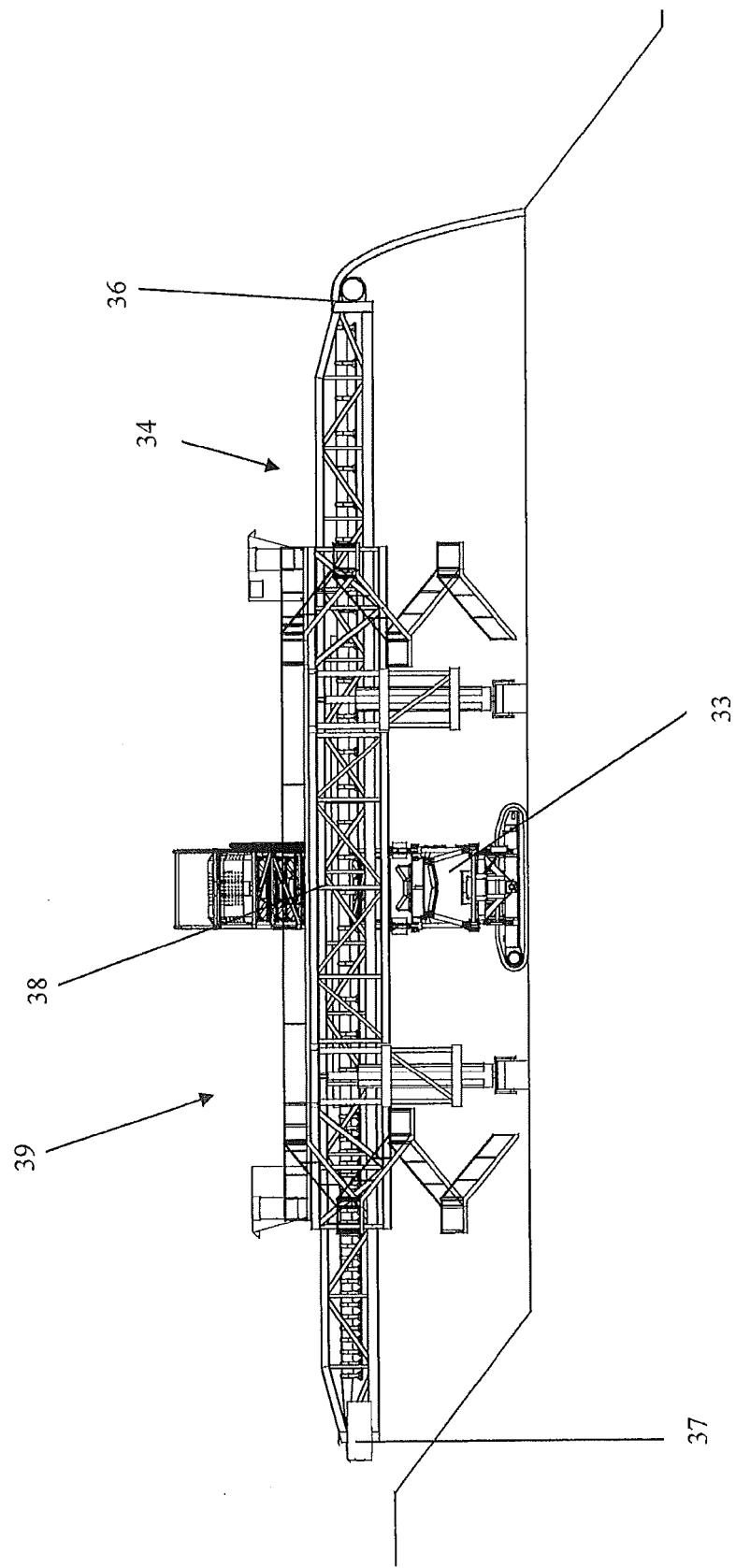
FIG. 3 is an end view of a second present preferred embodiment of the conveying system, which includes a second present preferred embodiment of a mobile bridge conveyor and a second present preferred embodiment of a conveyor apparatus.
Figure 4:
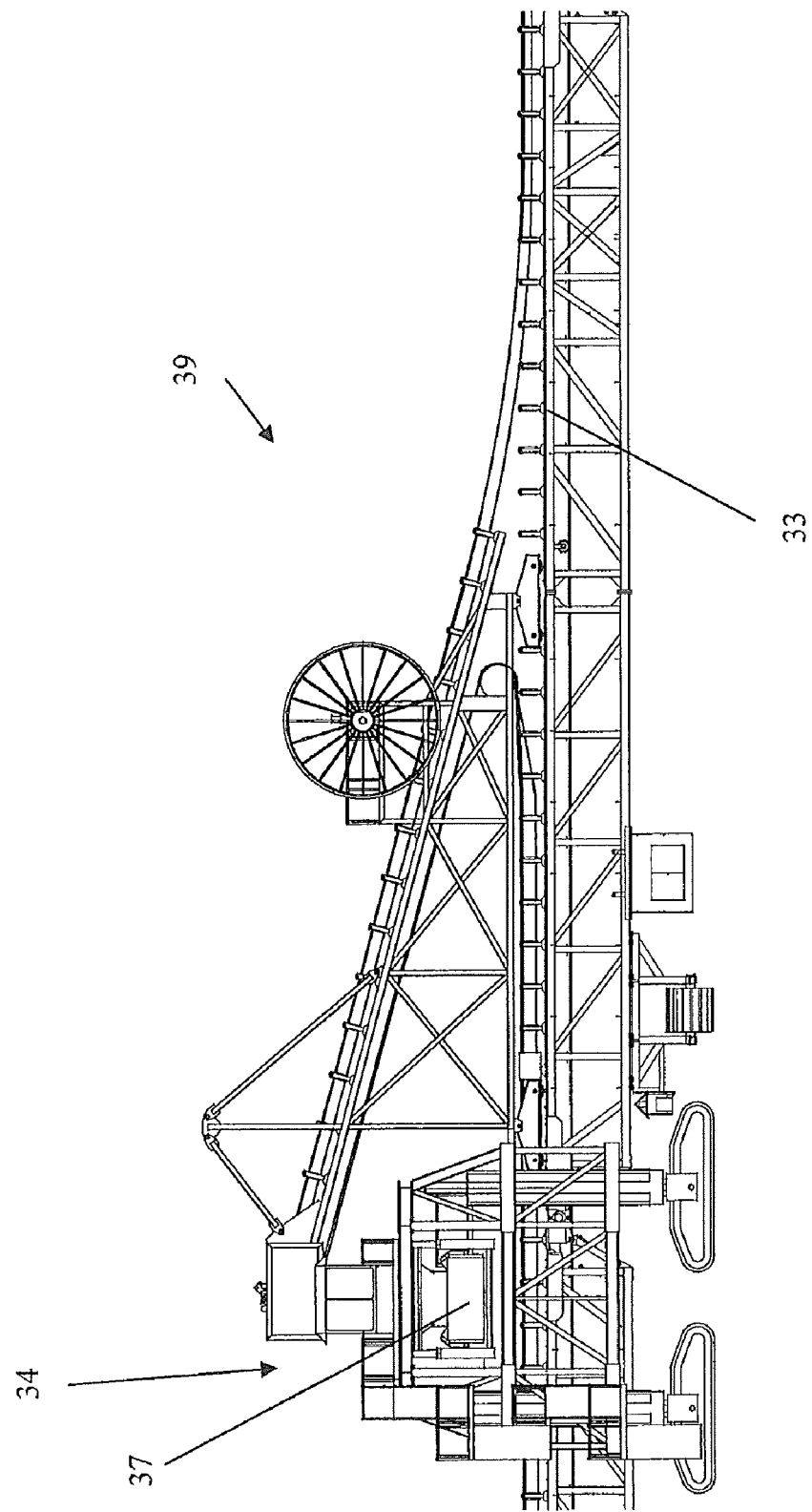
FIG. 4 is a side view of a second present preferred embodiment of the conveying system.
Figure 5:
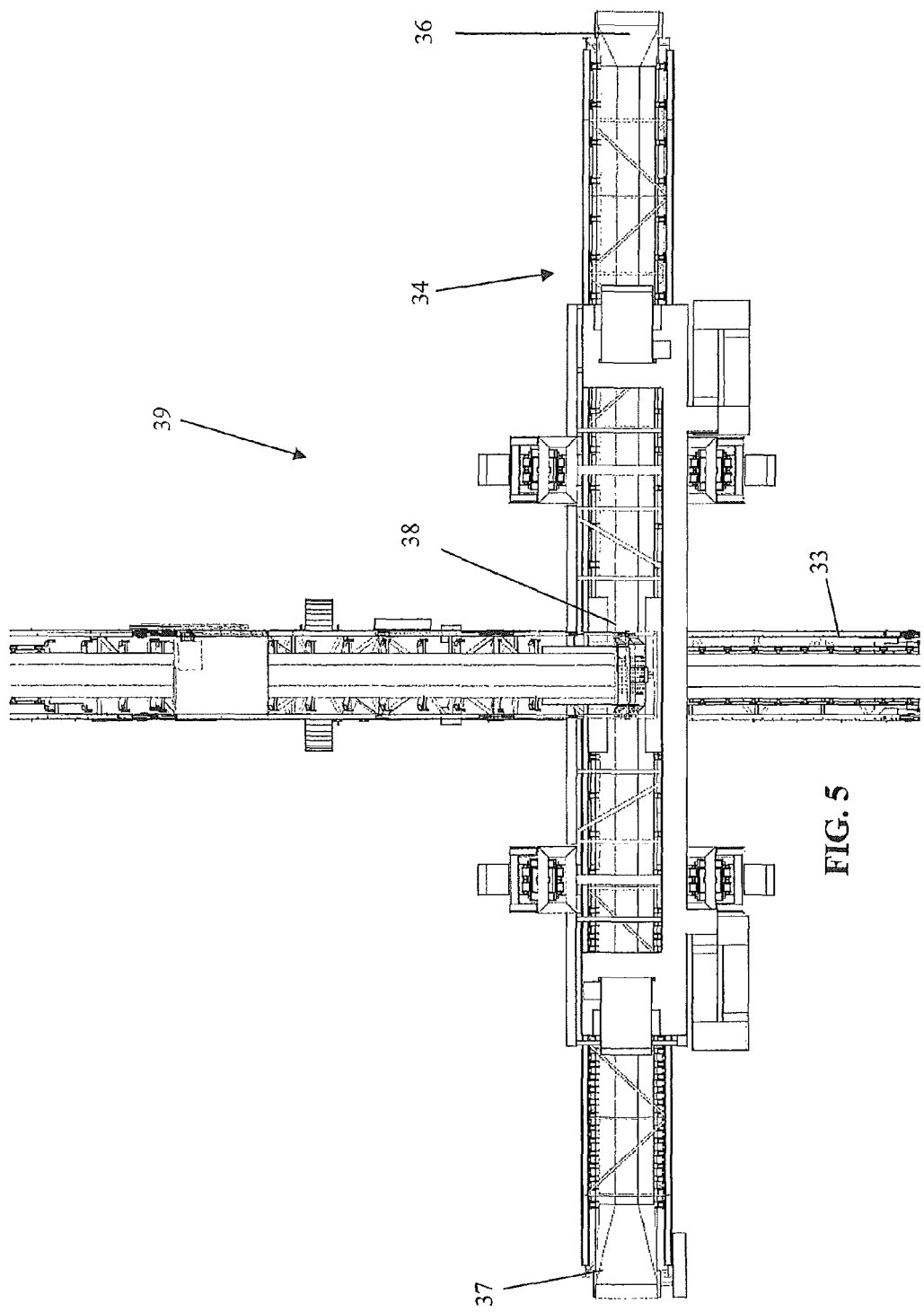
FIG. 5 is a top view of the second present preferred embodiment of the conveying system.

A second embodiment of the conveying system 39 is shown in FIGS. 3, 4 and 5. The conveying system 39 includes a bridge conveyor 33 and a conveyor apparatus 34. The conveyor apparatus 34 includes a cross conveyor that has a first end 36, a second end 37 and a middle portion 38. The middle portion 38 is configured to be positioned under a tripper discharge end for receiving material from the tripper conveyor device of the bridge conveyor 33. The belt of the cross conveyor may be configured to move in opposite directions. When the belt is moving in a first direction, the belt of the cross conveyor may be configured to stack material from the first end 36 of the cross conveyor. The first end of 36 of the cross conveyor may be configured to provide advance stacking. When the belt is moving in a second direction, the belt of the cross conveyor may be configured to stack material from the second end 37 of the cross conveyor. The second end 37 of the cross conveyor may be configured to provide retreat stacking.

Figure 6:
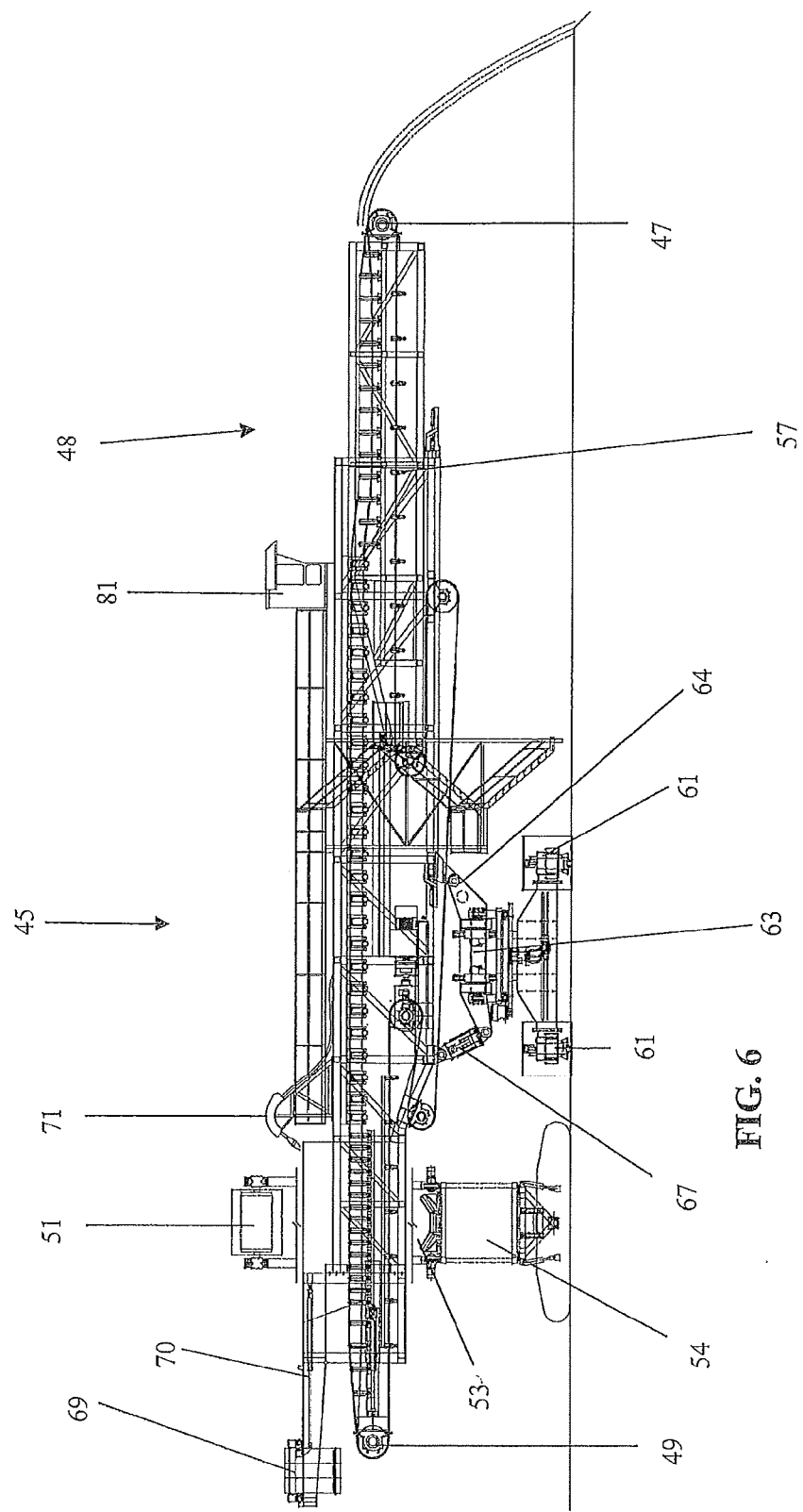
FIG. 6 is an end view of a third present preferred embodiment of the conveying system, which includes a third present preferred embodiment of a mobile bridge conveyor illustrated in broken line and a third preferred embodiment of a conveyor apparatus.
Figure 7:
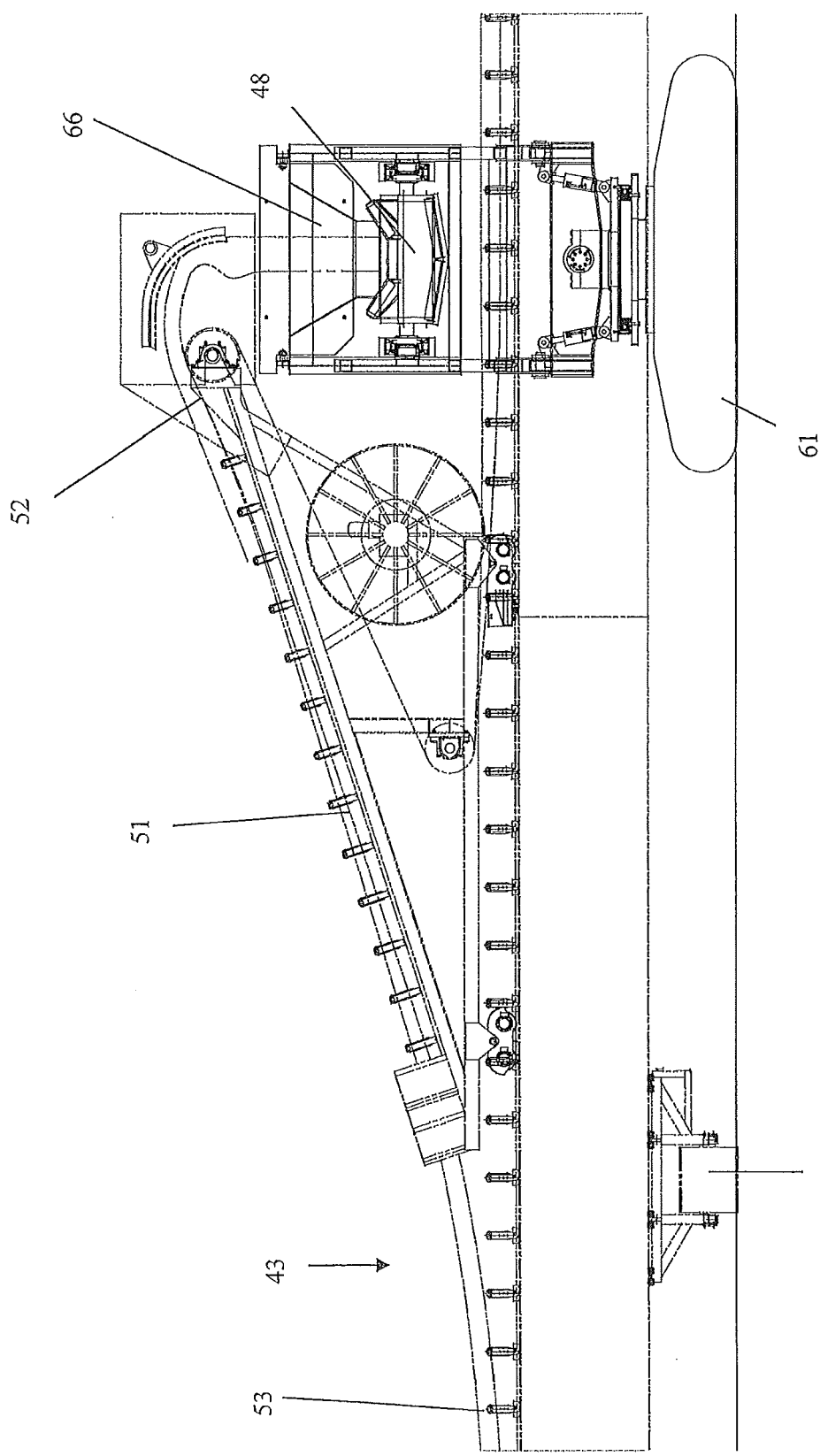
FIG. 7 is an enlarged fragmentary side view of the third present preferred embodiment of the conveying system, which includes the third present preferred embodiment of a mobile bridge conveyor shown in broken line and the third present preferred embodiment of a conveyor apparatus.

Another embodiment of the conveying system is shown in FIGS. 6 and 7. The conveying system includes a conveying device 45 and a mobile bridge conveyor 43. The mobile bridge conveyor 43 includes a frame 54 that is attached to rotatable members 55. The frame 54 supports a troughed conveyor belt 53 and a tripper conveyor device 51. The tripper conveyor device 51 may share a portion of the conveyor belt 53 with the mobile bridge conveyor 43 or may have a separate conveyor belt that is aligned with the conveyor belt 53.

The conveyor apparatus 45 has a frame that includes a base attached to rotatable members 61. The base includes a rotatable portion 63 that is configured to rotate to rotate the cross conveyor 48 of the conveyor apparatus 45. The cross conveyor 48 includes a moveable belt and has a first end 47 and a second end 49 opposite the first end 47. The cross conveyor is supported on the frame and is rotatable via rotation of the portion 63 of the base. The portion 63 of the base includes one or more gas cylinders, or pistons 67 that are configured to maintain or adjust the inclination of the cross conveyor 48 when it is rotated and while it moves material. The portion 63 of the base also includes a pivot point 64 that is configured to permit adjustment of the cross conveyor 48 such that the cross conveyor may also be pivoted to an inclined position or a declined position to stack material. Preferably, the pivot point 64 is a pivoting weldment positioned in the frame of the conveyor apparatus 45.

In alternative designs, the leveling of the cross conveyor can be performed by telescoping frame members that extend or retract to adjust the height of the cross conveyor. Such support members may level the cross conveyor or may position the cross conveyor in an inclined or declined position to adjust the stacking height of the cross conveyor.

Embodiments of the cross conveyor discussed herein may move angularly to rotate the position of the cross conveyor. Many embodiments, such as the embodiments of the conveyor apparatus shown in FIGS. 1-5 can be configured to move about forty-five degrees relative to the mobile bride conveyor. Such rotational movement can permit extended stacking so that a more efficient use of a stacking area may be made.

It should be appreciated that the rotation of the cross conveyor 48 can permit the cross conveyor to be moved to provide even greater stacking coverage such that an even more efficient use of a stacking area may be made. In fact, some embodiments can be configured to permit stacking along a path ranging from 0 degrees to 90 degrees or about 90 degrees.

Moreover, the conveyor apparatus 45 may be configured to move adjacent to an end portion of the mobile bridge conveyor 43 such that the conveyor apparatus moves from one side to an opposite side of the mobile bridge conveyor. Such movement may permit the conveyor apparatus 45 to move from one stacking area to another stacking area and may also permit stacking adjacent to a head end portion of the mobile bridge conveyor 43.

Most traditional systems utilize cross conveyors that are unable to stack material at ends of a mobile bridge conveyor. Often, dozing equipment was used to push material to such locations in a storage area to store material in a storage area. The rotatable cross conveyor can permit the cross conveyor 48 to be positioned to stack material adjacent to the distal ends of the mobile bridge conveyor 43. Thus, dozing equipment is no longer necessary to stack material adjacent to these distal ends. Such functionality can permit conveying systems to not require the use of certain equipment, such as dozing equipment, which reduces the capital and operational costs of operating the stacking system to stack material.

A telescoping structure 57 may be attached to the first end 47 of the cross conveyor. The telescoping discharge structure 57 is configured to extend the first end 47 to discharge material for stacking the material and is also configured to retract the first end 47. A counterweight 69 may also be attached to the frame of the conveyor apparatus or the cross conveyor 48 of the conveyor apparatus. The counterweight 69 is moveable to balance the conveyor apparatus when the telescoping structure 57 is extended. The counterweight 69 may be configured to move away from the telescoping structure when the telescoping structure is extended to balance the weight of the conveyor apparatus 45. An actuator 70 may be attached to the counterweight 69 and may be configured to move the counterweight upon extension or retraction of the telescoping structure. Alternatively, the conveyor apparatus 45 may be sized and configured to weigh enough to avoid the use or need of a moveable counterweight during extension or retraction of the telescoping structure 57.

The frame of the conveyor apparatus may also include a power supplying device 71 that is configured for connection to a portion of the tripper conveying device 51. The power supplying device can transmit electricity to the cross conveyor device to cause the conveyor belt of the cross conveyor device to move. The frame may also support a cab 81 that is sized and configured to permit a user to control movement of the conveyor apparatus 45.

A cable drum may also be attached to the frame. The cable drum may be configured to gather and expel cable connecting a power source to a powering device of the conveyor apparatus 45.

The frame of the conveyor apparatus 45 is configured such that the rotatable members 61 are positioned adjacent to only one side of the mobile bridge conveyor 43 when the cross conveyor 48 is positioned below the upper end of the tripper conveyor device 51 to receive material from the upper end portion 52 of the tripper conveyor device 51 and move that material toward a storage pile for stacking the material. The second end 49 of the cross conveyor can be configured to be positioned below the tripper conveyor device 51 to receive the material.

As may best be seen in FIG. 7, a hopper 66 may be attached to the frame of the conveyor apparatus 45 and can be positioned above the cross conveyor 48 such that the hopper 66 is configured to receive material from the tripper conveyor device 51 and guide that material to the cross conveyor 48. The hopper 66 is preferably positioned on the frame such that the hopper 66 is above a portion of the cross conveyor 48 and below the upper end portion 52 of the tripper conveyor device 51 when the second end 49 of the cross conveyor is positioned under the upper end 52 of the tripper conveyor device 51 to receive material from the tripper conveyor device and move that material to stack the material.

Figure 9:
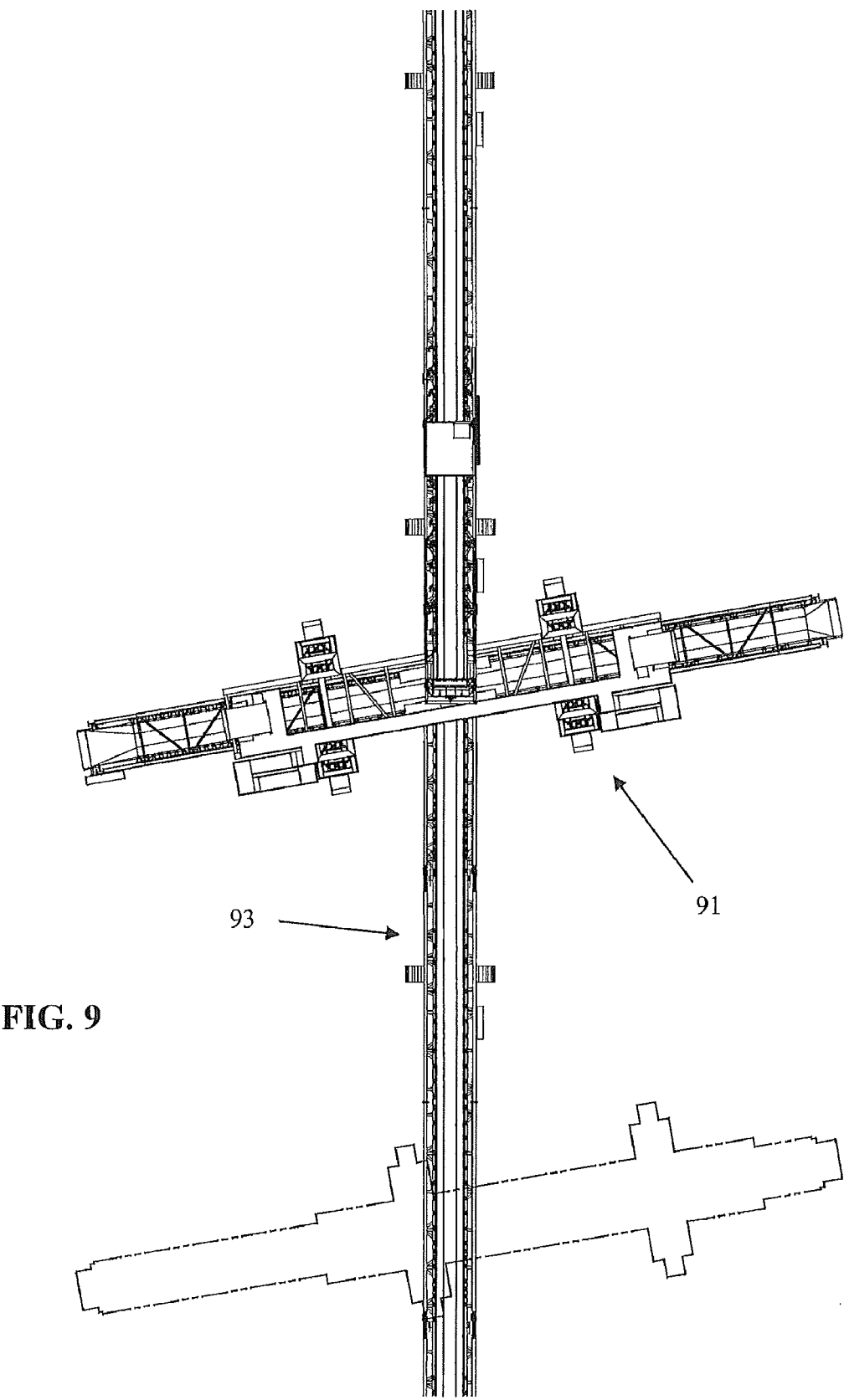
FIG. 9 is a top view of a fourth embodiment of a present preferred conveying system in a first position. The fourth present preferred embodiment of the conveying system includes a fourth present preferred embodiment of a mobile bridge conveyor and a fourth present preferred embodiment of a conveyor apparatus. A subsequent position of the conveyor apparatus relative to the mobile bridge conveyor is shown in broken line.
Figure 10:
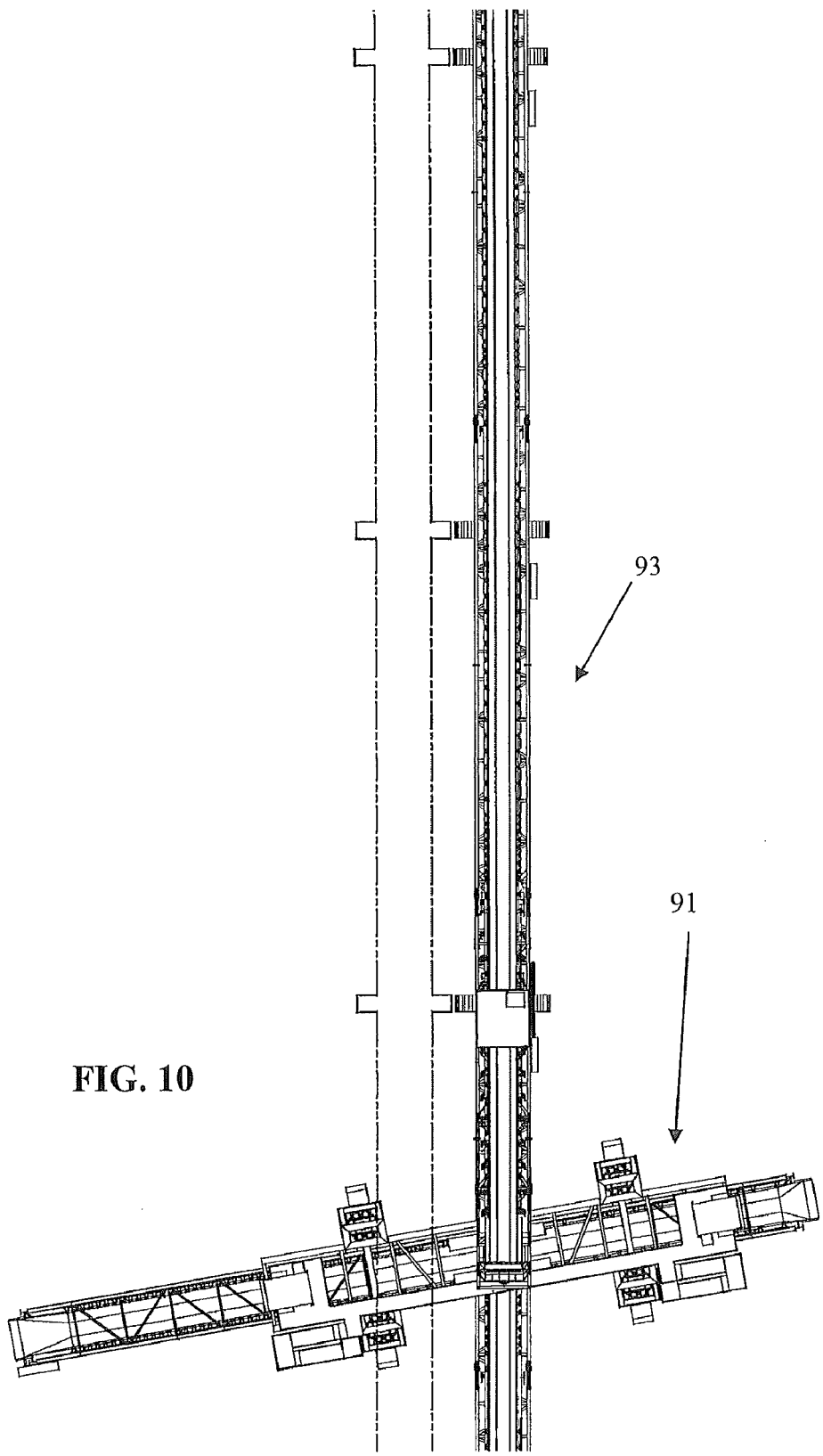
FIG. 10 is a top view of the fourth present preferred embodiment of the conveying system in a second position. A prior position of the mobile bridge conveyor is shown in broken line and the conveyor apparatus is shown in the subsequent position illustrated in broken line in FIG. 9.

Referring to FIGS. 9-10 a conveyor apparatus 91 may be positionable relative to a mobile bridge conveyor 93. A controller may be connected to the conveyor apparatus 91 and a GPS sensor or other location sensor may be attached to each end of the cross conveyor of the conveyor apparatus 91. The controller may also be attached or connected to the mobile bridge conveyor 93. The mobile bridge conveyor 93 may also include a GPS sensor on each end of the mobile bridge conveyor and at the upper end of the tripper conveyor device moveably attached to the mobile bridge conveyor. The GPS sensors may be connected to the controller via a wireless connection or some connection mechanism permitting the sensors to transmit data to the controller.

The controller may include a processing unit and memory that has software run by the processing unit. The software may be configured to determine when the conveyor apparatus or mobile bridge conveyor is positioned beyond a predefined allowable distance from the other device and cause one or both of the devices to move to adjust the position of the devices to within a predefined tolerable position.

For example, the controller may be configured to run software so that the conveyor apparatus 91 is moved relative to the mobile bridge conveyor 93 when the mobile bridge conveyor is stationary. The controller may be configured such that a position of an end of the cross conveyor that is determined via a position of that end measured by a GPS sensor. If the position is determined to be a predefined distance away from a portion of the mobile bridge conveyor 93, the controller can be configured to cause the conveyor apparatus 91 to move to readjust its position relative to the mobile bridge conveyor 93 to be within this predefined distance.

The predefined distance may be measured from a GPS sensor located on the mobile bridge conveyor or the controller may be configured to measure the predefined distance based on a center line or other position that is determined based on the location of different GPS sensors located on the mobile bridge conveyor. For instance, a GPS sensor on each end of the mobile bridge conveyor may define two end points of a line that is determined by the controller. When an end of the cross conveyor is determined to be a predefined distance from this line via the GPS sensor attached to that end of the cross conveyor, the controller may be configured to cause the conveyor apparatus to move to readjust its position relative to the mobile bridge conveyor. The distance may be measured as a straight line distance from the line or may be measured as a distance relative to a centered mid point or non-centered mid point of the line.

The controller can also be configured to make the mobile bridge conveyor 93 a slave to the location or position of the conveyor apparatus 91. For example, the controller can be configured to determine if the location of the tripper conveyor device is too close to an end of a cross conveyor. If the controller determines via a GPS sensor on the tripper conveyor device that the tripper conveyor device is within a predefined distance from an end of the cross conveyor, the controller can be configured to cause the mobile bridge conveyor to move to readjust the position of the mobile bridge conveyor relative to the conveyor apparatus such that the tripper is repositioned farther than the predefined distance from that end of the cross conveyor. Such readjustment may occur while both the mobile bridge conveyor and the conveyor apparatus are moving.

As yet another option, the controller can be configured to determine a line between end points defined by the location of the ends of the cross conveyor via the GPS sensors attached to those ends of the cross conveyor. When a GPS sensor attached to an upper end of the tripper conveyor device of the mobile bridge conveyor is determined to be a predetermined distance from this line, the controller can be configured to cause a portion of the mobile bridge conveyor to move to straighten the mobile bridge conveyor. The predetermined distance or amount may be defined by some tolerance range of the line measured between the ends of the mobile bridge conveyor.

The controller may also be configured to adjust from a first configuration to a second configuration. For example, the controller may be configured to adjust from a configuration in which the conveyor apparatus position is slaved to the mobile bridge conveyor to a configuration in which the position of the mobile bridge conveyor is slaved to the position of the conveyor apparatus. A button or actuator may be connected to the controller such that an operator may manipulate the button or actuator to adjust the configuration of the controller. A key pad, key board, or other actuation mechanism may be connected to the controller such that the operator can also provide other input to the controller. A display device may also be connected to the controller such that the controller can transmit output to the display device for displaying the output to the operator.

As may be appreciated from FIG. 9, the controller may also be configured to cause the conveyor apparatus and the cross conveyor of the conveyor apparatus to move while the mobile bridge conveyor and the conveyor apparatus are moving. Such movement may occur while material is being stacked to ensure the material is stacked in a straight pile. For instance, movement or repositioning of the conveyor apparatus and the mobile bridge conveyor away from a stacked pile may cause the controller to cause the cross conveyor to extend outward toward the stacked pile to ensure the material being stacked is stacked in a straight pile even when the conveyor apparatus and the mobile bridge conveyor are being moved or repositioned. As another example, the controller can be configured to cause the cross conveyor to retract or move away from the stacked pile to ensure the material being stacked is stacked in a straight pile even when the conveyor apparatus and the mobile bridge conveyor are being moved or repositioned.

Figure 11:
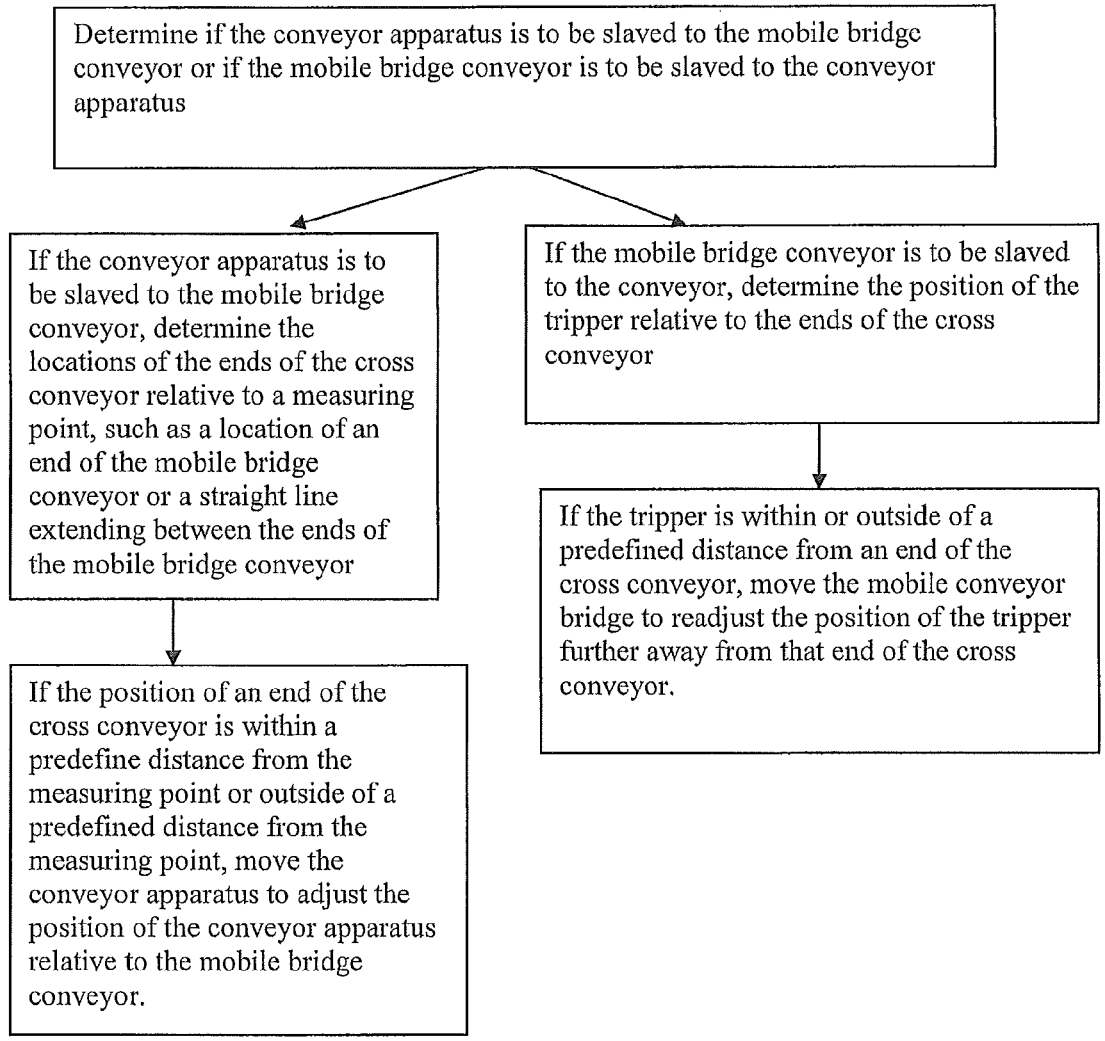
FIG. 11 is a flow chart illustrating a present preferred method of determining when to adjust the position of a mobile bridge conveyor or a conveyor apparatus.

It should be understood that the controller may be attached to the mobile bridge conveyor or the conveyor apparatus or may be in a position remote to those devices. It should also be understood that the controller may be configured to control movement as described in the flow chart of FIG. 11.

A contractor or other entity may provide a conveying system such as the conveying systems shown in FIGS. 1-7 and 9-10. For instance, the contractor may receive a bid request for a project related to designing a system for stacking material or may offer to design such a system. The contractor may then provide a mobile bridge conveyor and a conveyor apparatus, such as embodiments of the mobile bridge conveyor and conveyor apparatus discussed above. The contractor may provide such devices by selling those devices or by offering to sell those devices. The contractor may provide embodiments that are sized and configured to meet the design criteria of a client or customer. The contractor may subcontract the fabrication, delivery, sale, or installation of a component of any of the devices or of other devices to provide such devices. The contractor may also survey a site and design or designate one or more storage areas for stacking the material. In addition to providing a mobile bridge conveyor and a conveyor apparatus, the contractor may also provide overland conveyors, overland trippers, reclaimers, mobile hoppers or other conveyors. The contractor may also maintain, modify or upgrade the provided devices. The contractor may provide such maintenance or modifications by subcontracting such services or by directly providing those services.

While certain present preferred embodiments of the conveying system and conveyor apparatus and methods of making and using the same have been shown and described above, it is to be distinctly understood that the invention is not limited thereto but may be otherwise variously embodied and practiced within the scope of the following claims.

What is claimed is:

1. A method of providing a conveying system for stacking material comprising:
 providing a mobile bridge conveyor having a tripper conveyor device, the tripper conveyor device having an upper end and a lower end opposite the upper end;
 providing a conveyor apparatus comprising:
  a frame and a cross conveyor,
   the frame having a base and a plurality of rotatable members attached to the base, the rotatable members configured to rotate to move the frame on ground such that the conveyor apparatus is moveable relative to the mobile bridge conveyor,
   the cross conveyor having a moveable belt sized and configured to receive and move material, the cross conveyor supported by the frame, the frame sized and configured to be positionable adjacent to the mobile bridge conveyor independent of the mobile bridge conveyor such that a portion of the cross conveyor is positionable under the upper end of the tripper conveyor device to receive material from the tripper conveyor device; and
 providing a controller communicatively connectable to at least one of the mobile bridge conveyor and the conveyor apparatus, the controller actuating movement of one of the mobile bridge conveyor and the frame of the conveyor apparatus to adjust a position of the one of the mobile bridge conveyor and the frame of the conveyor apparatus when the controller determines at least one of:
  (i) that the conveyor apparatus is positioned more than a first predetermined distance away from the mobile bridge conveyor, and
  (ii) that the conveyor apparatus is positioned less than a second predetermined distance away from the mobile bridge conveyor,
  the controller actuated movement of the one of the mobile bridge conveyor and the frame of the conveyor apparatus being performed such that the conveyor apparatus is within the first distance of the mobile bridge conveyor and is more than the second distance away from the mobile bridge conveyor; and
 the mobile bridge conveyor and conveyor apparatus configured to move material to a stacking area or a storage area to stack the material when positioned adjacent to each other such that the portion of the cross conveyor is positioned under the upper end of the tripper conveyor device to receive material from the tripper conveyor device.

2. The method of claim 1 wherein the rotatable members are crawlers or tracks and the frame of the conveyor apparatus is configured to be releasably connectable to the tripper conveyor device such that movement of the frame of the conveyor apparatus also moves the tripper conveyor device when the tripper conveyor device is connected to the frame of the conveyor apparatus, the conveyor apparatus also comprising a powering device supported by the frame of the conveyor apparatus, the powering device configured to connect to a power distribution connector of the mobile bridge conveyor or a power distribution connector of a remote generator, the powering device configured to connect to at least one of the rotatable members and the cross conveyor to provide power to at least one of the rotatable members and the cross conveyor, and wherein the tripper conveyor device is moveably constrained to the frame of the mobile bridge conveyor.

3. The method of claim 1 wherein the frame of the conveyor apparatus is configured such that the rotatable members are positioned on only one side of the mobile bridge conveyor when the frame of the conveyor apparatus is positioned adjacent to the mobile bridge conveyor such that the portion of the cross conveyor is positionable under the upper end portion of the tripper conveyor device to receive material from the tripper conveyor device and move the material.

4. The method of claim 1 wherein the mobile bridge conveyor has a first side and a second side opposite the first side and the frame of the conveyor apparatus is configured such that at least one of the rotatable members is positioned adjacent to the first side of the mobile bridge conveyor and at least one of the rotatable members is positioned adjacent to the second side of the mobile bridge conveyor when the frame of the conveyor apparatus is positioned adjacent to the mobile bridge conveyor such that the portion of the cross conveyor is positionable under the upper end portion of the tripper conveyor device to receive material from the tripper conveyor device and move the material.

5. The method of claim 1 wherein a portion of the base of the conveyor apparatus is rotatable such that rotation of the base rotates the cross conveyor.

6. The method of claim 1 wherein the cross conveyor has a first end and a second end opposite the first end, the first end of the cross conveyor configured to be the portion of the cross conveyor that is positionable under the upper end portion of the tripper conveyor device to receive material from the tripper conveyor device.

7. The method of claim 1 wherein the cross conveyor has a first end, a second end opposite the first end and a middle portion between the first and second end, the middle portion of the cross conveyor being the portion of the cross conveyor that is positionable under the upper end portion of the tripper conveyor device to receive material from the tripper conveyor device and move the material.

8. The method of claim 7 wherein the moveable belt of the cross conveyor is configured to move in a first direction and a second direction opposite to the first direction, the moveable belt of the cross conveyor configured to move the material toward a stacking area or a storage area located adjacent to the first end of the cross conveyor when moving in the first direction and also configured to move the material toward a stacking area or a storage area located adjacent to the second end of the cross conveyor when moving in the second direction.

9. The method of claim 1 wherein the cross conveyor has a first end and a second end opposite the first end, the conveyor apparatus further comprised of a luffing conveyor device attached to at least one of the first end of the cross conveyor and the second end of the cross conveyor.

10. The method of claim 1 wherein the cross conveyor has a first end and a second end opposite the first end, the conveyor apparatus further comprised of a telescoping discharge structure attached to the first end of the cross conveyor, the telescoping discharge structure moveable from a retracted position to an extended position.

11. The method of claim 10 wherein the conveyor apparatus is further comprised of a moveable counterweight attached to at least one of the cross conveyor and the frame, the counterweight configured to move to balance the conveyor apparatus when the telescoping discharge structure is extended or retracted, the counterweight being moved away from the first end of the cross conveyor when the telescoping discharge structure is extended.

12. The method of claim 1 wherein the conveyor apparatus is further comprised of at least one hopper attached to the frame above the cross conveyor, the at least one hopper configured to be positioned adjacent to the upper end portion of the tripper conveyor device to receive material from the tripper conveyor device and guide the material to the cross conveyor when the frame is positioned adjacent to the mobile bridge conveyor such that the portion of the cross conveyor is positioned under the upper end portion of the tripper conveyor device to receive material from the tripper conveyor device and move the material.

13. The method of claim 1 wherein the conveyor apparatus is further comprised of a power distributing device attached to the frame of the conveyor apparatus, the frame of the conveyor apparatus configured to releasably connect to the tripper conveyor device such that the power distributing device is attached to a component of the tripper conveyor device to power a moveable belt of the cross conveyor when the tripper conveyor device is connected to the frame of the conveyor apparatus.

14. The method of claim 13 further comprising connecting the cross conveyor apparatus to the tripper conveyor device and moving the conveyor apparatus adjacent to the mobile bridge conveyor to drive movement of the tripper conveyor device along a portion of the mobile bridge conveyor when the tripper conveyor device is connected to the cross conveyor apparatus, the cross conveyor apparatus moving independent of the mobile bridge conveyor and movement of the tripper conveyor device along the portion of the mobile bridge conveyor being dependent upon movement of the conveyor apparatus when the tripper conveyor device is connected to the conveyor apparatus.

15. The method of claim 1 wherein the tripper conveyor device has a moveable belt and the conveyor apparatus is releasably connectable to the tripper conveyor device, the conveyor apparatus further comprising a power supplying device attached to the frame, the frame configured to connect to the tripper conveyor device such that the power supplying device is attached to a component of the tripper conveyor device to power the moveable belt of the cross conveyor when the tripper conveyor device is connected to the frame of the conveyor apparatus.

16. The method of claim 15 wherein the tripper conveyor device is configured to move along the mobile bridge conveyor and wherein the conveyor apparatus is configured such that movement of the conveyor apparatus also moves the tripper conveyor device along a portion of the mobile bridge conveyor when the tripper conveyor device is connected to the frame of the conveyor apparatus.

17. The method of claim 1 wherein the provided controller actuates movement of one of the mobile bridge conveyor and the frame of the conveyor apparatus to adjust a position of the one of the mobile bridge conveyor and the frame of the conveyor apparatus when the controller determines that the conveyor apparatus is positioned less than the second predetermined distance away from the mobile bridge conveyor so that the one of the conveyor apparatus and mobile bridge conveyor is moved such that the conveyor apparatus is positioned more than the second predetermined distance away from the mobile bridge conveyor, the controller receiving data from the at least one sensor attached to the mobile bridge conveyor and at least one sensor attached to the conveyor apparature to determine that the conveyor apparatus is positioned less than the second predetermined distance away from the mobile bridge conveyor; and wherein the provied controller actuates movement of one of the mobile bridge conveyor and the frame of the conveyor apparatus to adjust a position of the one of the mobile bridge conveyor and the frame of the conveyor apparatus when the controller determines that the conveyor apparatus is positioned more than the first predetermined distance away from the mobile bridge conveyor so that the one of the conveyor apparatus and mobile bridge conveyor is moved such that the conveyor apparatus is positioned within the first predetermined distance from the mobile bridge conveyor, the controller receiving data from the at least one sensor attached to the mobile bridge conveyor and the at least one sensor attached to the conveyor apparatus to determine that the conveyor apparatus is positioned less than the second predetermined distance away from the mobile bridge conveyor.

18. The method of claim 1 wherein the provided controller actuates movement of one of the mobile bridge conveyor and the frame of the conveyor apparatus to adjust a position of the one of the mobile bridge conveyor and the frame of the conveyor apparatus when the controller determines that the conveyor apparatus is positioned less than the second predetermined distance away from the mobile bridge conveyor so that the one of the conveyor apparatus and mobile bridge conveyor is moved such that the conveyor apparatus is positioned more than the second predetermined distance away from the mobile bridge conveyor, the controller receiving data from the at least one sensor attached to the mobile bridge conveyor and at least one sensor attached to the conveyor apparatus to determine that the conveyor apparatus is positioned less than the second predetermined distance away from the mobile bridge conveyor.

19. The method of claim 1 wherein the mobile bridge conveyor is comprised of a frame that has rails, the frame of the mobile bridge conveyor supporting the tripper conveyor device and the tripper conveyor device is releasably connectable to the frame of the conveyor apparatus, the tripper conveyor device moveable along a path defined by the rails of the frame of the mobile bridge conveyor, the conveyor apparatus configured to connect to the tripper conveyor device such that movement of the conveyor apparatus also moves the tripper conveyor device along a portion of the path when the tripper conveyor device is connected to the frame of the conveyor apparatus.

20. A conveyor apparatus comprising:
a frame, the frame having a base and a plurality of rotatable members attached to the base, the rotatable members rotatable to move the frame directly on ground;
a cross conveyor, the cross conveyor having a moveable belt sized and configured to receive and move material, the cross conveyor supported by the frame; and
the frame positionable adjacent to a mobile bridge conveyor having a tripper conveyor device such that a portion of the cross conveyor is positionable under an upper end portion of the tripper conveyor device to receive material from the tripper conveyor device, the mobile bridge conveyor having a frame that moveably supports a conveyor of the mobile bridge conveyor and the tripper conveyor device of the mobile bridge conveyor, the frame of the conveyor apparatus being moveable relative to the mobile bridge conveyor when adjacent to the mobile bridge conveyor and the frame of the conveyor apparatus being moveable independent of the mobile bridge conveyor and the tripper conveyor device such that the cross conveyor is moveable independent of the mobile bridge conveyor and the tripper conveyor device when located under the upper end portion of the tripper conveyor device;
a controller communicatively coupled to at least one of the frame of the conveyor apparatus and the mobile bridge conveyor;
at least one sensor, each sensor of the at least one sensor attached to at least one of the frame of the conveyor apparatus and the cross conveyor;
the controller actuating movement of one of the mobile bridge conveyor and the frame of the conveyor apparatus to adjust a position of the one of the mobile bridge conveyor and the frame of the conveyor apparatus when the controller determines at least one of:
  (i) that the conveyor apparatus is positioned more than a first predetermined distance away from the mobile bridge conveyor, and
  (ii) that the conveyor apparatus is positioned less than a second predetermined distance away from the mobile bridge conveyor,
the controller receiving data from the at least one sensor to determine at least one of that the conveyor apparatus is positioned more than the first predetermined distance away from the mobile bridge conveyor and the conveyor apparatus is positioned less than the second predetermined distance away from the mobile bridge conveyor;
the controller actuated movement of the one of the mobile bridge conveyor and the frame of the conveyor apparatus being performed such that the conveyor apparatus is within the first distance of the mobile bridge conveyor and is more than the second distance away from the mobile bridge conveyor.

21. A conveying system comprising:
a mobile bridge conveyor having a frame, a conveyor belt and a tripper conveyor device aligned with the conveyor belt, the frame of the mobile bridge conveyor supporting the tripper conveyor device and the conveyor belt, the tripper conveyor device having an upper end and a lower end opposite the upper end, the lower end of the tripper conveyor device being adjacent to a portion of the conveyor belt; and
a conveyor apparatus comprising a frame and a cross conveyor, the frame of the conveyor apparatus having a base and a plurality of rotatable members attached to the base, the rotatable members being rotatable to move the frame directly on ground such that the conveyor apparatus is moveable relative to at least the frame of the mobile bridge conveyor; the cross conveyor having a moveable belt sized and configured to receive and move material, the cross conveyor supported by the frame of the conveyor apparatus, the frame of the conveyor apparatus being positionable adjacent to the mobile bridge conveyor such that a portion of the cross conveyor is positionable under the upper end of the tripper conveyor device to receive material from the tripper conveyor device and move the material, the cross conveyor and the frame of the conveyor apparatus being moveable independent of the mobile bridge conveyor and the tripper conveyor device such that the cross conveyor is moveable independent of the mobile bridge conveyor and the tripper conveyor device when located under the upper end portion of the tripper conveyor device;

a controller communicatively connected to at least one of the mobile bridge conveyor and the frame of the conveyor apparatus;

a plurality of sensors, each of the sensors attached to one of the frame of the conveyor apparatus, the mobile bridge conveyor, the tripper conveyor device of the mobile bridge conveyor, and the cross conveyor;

the controller actuating movement of one of the mobile bridge conveyor and the frame of the conveyor apparatus to adjust a position of the one of the mobile bridge conveyor and the frame of the conveyor apparatus when the controller determines at least one of:

(i) that the conveyor apparatus is positioned more than a first predetermined distance away from the mobile bridge conveyor, and (ii) that the conveyor apparatus is positioned less than a second predetermined distance away from the mobile bridge conveyor, the controller receiving data from the sensors to determine at least one of that the conveyor apparatus is positioned more than the first predetermined distance away from the mobile bridge conveyor and is less than the second predetermined distance away from the mobile bridge conveyor; and the controller actuated movement of the one of the mobile bridge conveyor and the frame of the conveyor apparatus being performed such that the conveyor apparatus within the first distance of the mobile bridge conveyor and more than the second distance away from the mobile bridge conveyor.

* * * * *